A. K. POTTER.
POCKET MANICURE IMPLEMENT.
APPLICATION FILED JULY 18, 1917.
1,240,485.
Patented Sept. 18, 1917.
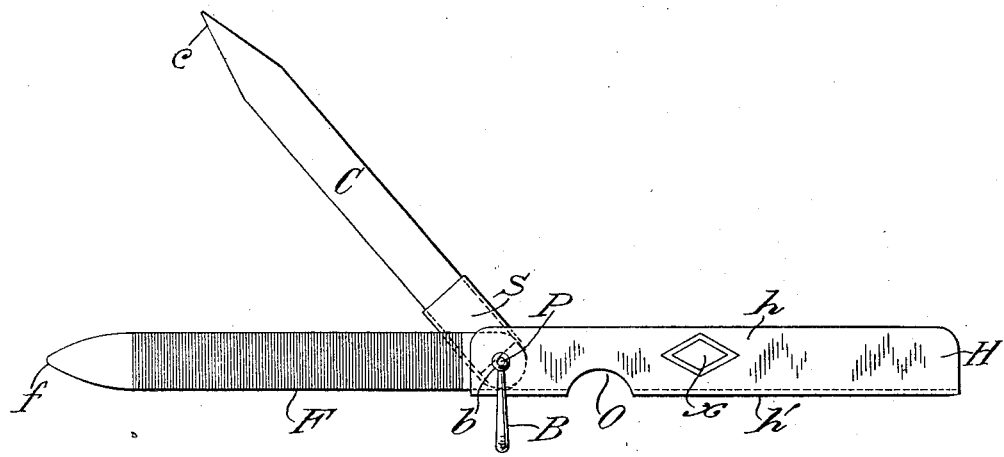
Fig. 1.
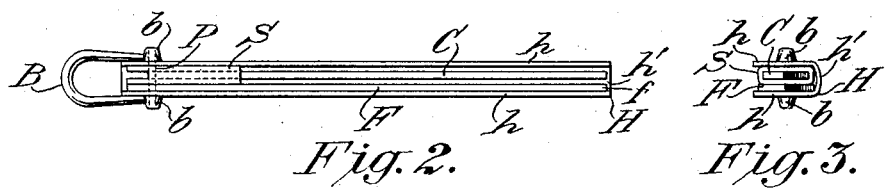 
Fig. 2. Fig. 3.
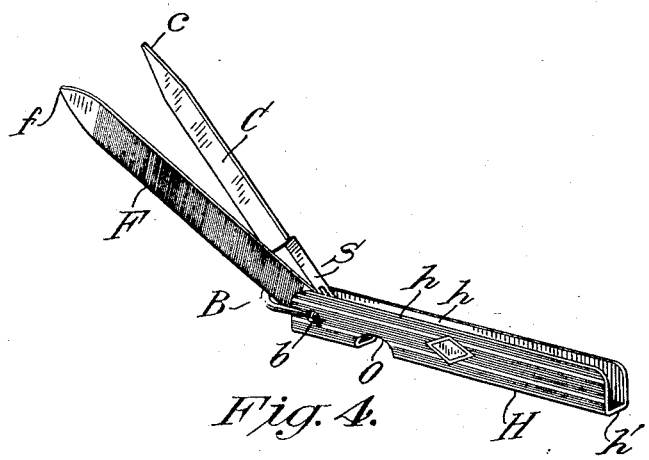
Fig. 4.
INVENTOR
Alfred K. Potter
BY
Arthur P. Armington
ATTORNEY ized relation with the handle it will swing into locking position with the pivot-pin P so that its outer end will be retained against side-movement.

UNITED STATES PATENT OFFICE.

ALFRED K. POTTER, OF PROVIDENCE, RHODE ISLAND, ASSIGNOR TO E. A. POTTER COMPANY, OF PROVIDENCE, RHODE ISLAND, A CORPORATION OF RHODE ISLAND.

POCKET MANICURE IMPLEMENT.

1,240,485.   Specification of Letters Patent.   Patented Sept. 18, 1917.

Application filed July 18, 1917. Serial No. 181,135.

*To all whom it may concern:*

Be it known that I, ALFRED K. POTTER, a citizen of the United States, residing at Providence, in the county of Providence, State of Rhode Island, have invented certain new and useful Improvements in Pocket Manicure Implements, of which the following is a specification.

My invention is an improved pocket manicure-implement adapted to be worn on the watch-chain and to be used in trimming and cleaning the finger-nails. The object of my improvement is to provide a device of this character having a nail-file and a socket-member for holding a nail-cleaning stick of orange-wood or the like, both of which elements are inclosed within an ornamental handle to be individually opened out therefrom as occasion requires.

The invention is fully described in the following specification, illustrated by the accompanying drawings, in which like reference characters designate like parts. In the drawings:—

Figure 1 is an enlarged, side view of the device, showing the manicuring-tools opened out from the handle or casing;

Fig. 2, a plan view illustrating the tools closed within the sides of the handle;

Fig. 3, an end view of the same; and

Fig. 4, a perspective view of the complete article showing the nail-file and cleaning-stick in opened relation.

Referring to the drawings, H designates a casing or handle of ornamental design constructed in the form of a trough-like, open-sided tube. As illustrated particularly in Fig. 3 the handle H is substantially U-shape in cross-section with its opposite, flat sides $h$, $h$ connected by an arcuate bottom-section $h'$. If preferred, however, the sides of the handle H might be oval or circular in cross-section, or struck up with any other desired contour to provide for variations in its ornamental appearance.

Riveted through the sides $h$, $h$ of the handle H at one end thereof is a pivot-pin or pintle P on which are hinged the file-blade F and socket-member S. The file F is of usual construction consisting in a flat blade having cross-cuts or serrations along its sides, and a pointed end $f$ which may be sharpened on its edges, if desired, to provide a cutting element. Abutting the side of the file-blade F at the inner end thereof is the socket-member S constructed in the form of an open-ended tube having a rectangular shape in cross-section as shown in Fig. 3. The socket S is adapted to receive the end of a flat stick C forced thereinto with a snug fit to hold it in position in parallel relation with the file-blade F.

The stick C is preferably made from orange- or box-wood or some such material having a fine grain and a smooth surface, and its end is pointed at $c$ to adapt it to be inserted under the finger-nails to clean the latter. The object of employing a wooden stick for this purpose is to guard against irritating or injuring the sensitive flesh under the nails and to prevent abrading the cuticle. The stick C may be whittled down or freshly pointed from time to time when its end becomes blunted or soiled, and in this way a much more efficient and sanitary cleaning-tool is provided. After the stick has been whittled down clear to its base it may be discarded and a fresh one substituted by simply inserting the end in the socket S. My improved device is therefore adapted for continuous use and may be carried in the pocket with both tools F and C folded into closed relation within the sides of the handle H. In this form it provides a particularly light and neat-appearing article with the manicuring-implements protected from injuring the apparel of the wearer.

Usually the end of the handle H is provided with a ring or bail B which may be hooked into the end of a watch-chain to attach it thereto. As shown in Fig. 2, the bail B is preferably constructed of wire bent into a U-shaped loop with its extremities connected to the ends of the pivot-pin P. For this purpose the ends of the wire are formed with hubs or enlargements $b$, $b$ which are bored to receive the ends of the pin P and connected thereto by riveting or other means.

To provide for greater convenience in opening the blades or tools F and C from the handle H the latter is preferably cut away on its bottom with a circular opening O. This allows the finger to be pressed against the sides of the tools to swing them outwardly from the casing H so that they may be readily grasped and opened up the full distance. It will be understood that usually only one tool is opened out at a time, and when swung clear back into alinement with the handle H its side strikes against the bottom thereof to limit its movement, the file F being shown in this position in Fig. 1. When the stick C is to be used, it is opened out to the same position and the file F is closed within the handle H. Fig. 2 illustrates both tools in closed relation within the sides of the handle H to adapt the article to be carried in the wearer's pocket. In Fig. 1 the sides of the handle H are shown ornamented with a central panel $x$, adapted to be engraved with initials, or any other style of ornamentation may be applied by engraving or lining the surface as indicated in Fig. 4.

It will be observed that my improvement provides an extremely light-weight, compact article of highly ornamental appearance, while at the same time affording the maximum utility for the purpose intended. The provision of the orange- or box-wood stick adapts the implement for cleaning the nails in accordance with the most approved method without danger of injuring the fingers, and further allows for renewal or replacement of the cleaning point as required.

It is obvious that the tools or implements F and C might be adapted to close into the handle H through some other arrangement, for instance, by sliding or telescoping them between its sides, and I do not limit myself as to this feature of construction. Various other modifications might also be made in the form and structure of the parts of the device without departing from the spirit or scope of the invention; therefore, without limiting myself to the exact embodiment herein shown and described, what I claim is:—

1. In a pocket manicure-implement, the combination with a hollow case-like handle, of a permanent blade mounted within the sides of the handle to adapt it to open out therefrom, a socket-member also inclosed within the handle and arranged to open out therefrom, and a replaceable wooden stick fitted to the socket-member to adapt it to open and close therewith.

2. In a pocket manicure-implement, the combination with a hollow case-like handle, of a file-blade pivoted at one end to the handle to adapt it to fold between the sides thereof, a socket-member also pivoted to the handle to close into position between its sides, and a wooden stick having its end inserted in the socket-member to adapt it to open and close therewith while allowing for its removal and replacement.

3. An improved pocket manicure-implement comprising a case-like handle constructed in the form of an open-sided tube, a pivot-pin riveted through the sides of the handle, a file-blade hinged on said pin to adapt it to close into position between the sides of the handle, a tubular socket-member pivoted on the pin at the side of the file-blade, and a wooden stick having its end inserted in the socket-member to adapt it to open and close therewith while being removable therefrom.

4. An improved pocket manicure-implement comprising a sheath-like handle constructed from U-shaped tubing, a file-blade pivoted at one end to the handle to adapt it to close between the sides thereof, an open-ended socket-member also pivoted to close within the handle, and a wooden stick inserted in the socket-member to adapt it to open and close therewith, said handle formed with an opening on its side for the insertion of the finger to assist in opening the tools out therefrom.

In testimony whereof I affix my signature.

ALFRED K. POTTER.